W. R. HARMON.
Shovel-Plow.
No. 68,982.
Patented Sept. 17, 1867.
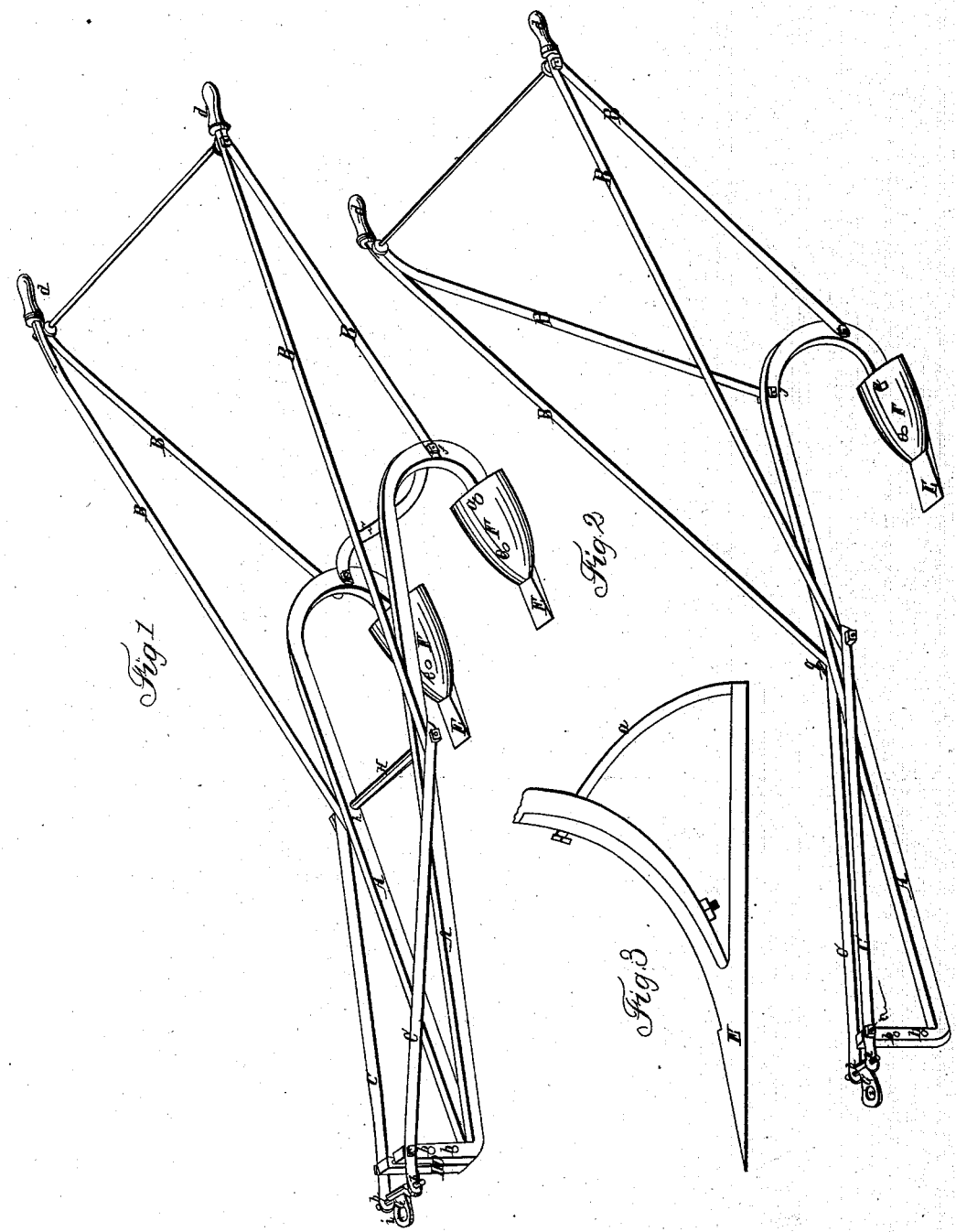
Witnesses:
Inventor:

United States Patent Office

WILLIAM RUFUS HARMON, OF UNION PORT, OHIO.

*Letters Patent No. 68,982, dated September 17, 1867.*

IMPROVEMENT IN SHOVEL-PLOUGHS.

*The Schedule referred to in these Letters Patent and making part of the same.*

TO ALL WHOM IT MAY CONCERN:

Be it known that I, WILLIAM RUFUS HARMON, of Union Port, Jefferson county, Ohio, have invented certain new and useful Improvements in Shovel-Ploughs; and I do hereby declare that the following is a full, clear, and exact description of the same, reference being had to the annexed drawing, and to the letters of reference marked thereon, making part of the same, in which—

Figure 1 is a perspective view of a double-shovel plough with my improvements attached.

Figure 2 is a perspective view of a single-shovel plough with my improvements attached.

Figure 3 is a plan view of a shoe and shovel, showing the method of attaching the same.

The object of my invention is to do away with the disadvantages that experience has proven to exist in the ordinary shovel-plough or cultivator now in general use, and consists, first, in a simple and practical method, by means of adjustable rods and guide-plates, of regulating the depth of furrow to be cut; second, in so arranging the rods at the point of the beam, in connection with the shoe and shovel, that, no matter what the depth of furrow required, the shoe always presents a flat surface to the earth; third, in a simple means of attaching the ploughs together, so that they can be used for working a double furrow, the shoes always being parallel to each other, and consequently necessarily cutting furrows which are exactly parallel, thus overcoming the objection to all double ploughs now in use, the shovels of which are not parallel, but whose points invariably verge towards each other; and fourth, in arranging at the end of the plough, and entirely distinct from its beam, a self-adjusting clevis.

My plough not only differs in construction and arrangement from any of the shovel-ploughs or cultivators now in common use, but also in principle. They all work on what may be termed a scraping, while my plough works on the cutting principle, like the ordinary subsoil plough. In the ordinary shovel-plough or cultivator the entire strain of opening the furrow is upon the immediate point of the shovel, and that, too, not when the shovel is presented in a flat, but in an angular direction. The consequence is the point of the shovel is soon worn away, if not, as is frequently the case, entirely broken off. In my plough the shoe cuts the furrow. The shovel simply opens the same. Again, the entire labor of regulating the depth of furrow made by the shovel-plough or cultivator now in use the farmer is compelled to perform, while in my plough it is done by means of rods and a guide-plate, the farmer only having to direct its course. But one of the greatest advantages of my invention consists in the simple arrangement by which I unite the plough together, by which means one plough, one man, and one horse can readily perform the labor of two ploughs, two men, and two horses, and also to do it in a better and more thorough manner. By means of rods and bolts I firmly secure the ploughs together, their shoes being four feet, or any distance desired, from each other. The furrows they cut are not only parallel and regular, but their depth is more uniform. In one of the ordinary light shovel-ploughs or cultivators now in use, if you strike a stone or root, the cultivator is thrown entirely out of its course, a portion of the furrow is skipped over, and the work consequently improperly performed. With my double plough this difficulty is entirely overcome. One plough steadies the other, and, it matters not what obstacle it encounters, it is kept in its proper direction.

To enable others skilled in the art to make and use my invention, I will proceed to describe its construction and operation.

I construct the beam A of wrought iron, curved at its rear end to receive the shoe and shovel. B B are the plough-handles, which are firmly secured, one at the rear and the other midway of the beam A. C C are adjustable guide-rods, which are firmly secured to the beam A near its centre. D D is a guide-plate at the end of the beam A, and at right angles thereto. E is the shoe, and F the shovel, each of which is secured, and by the same bolt, to the lower end of the curved portion of the beam A. The shoe E, at its rear end, is also connected with the beam by means of a brace-rod, a. In the guide-plate D there is a series of holes, b, which receive the bolt c that passes through rods C C, and which regulate the depth of furrow. d d are the hand-holds at the end of the handles B B. e is a bolt, which passes through the beam A at the lower portion of the curve, and also through the shovel and shoe, and firmly secures the three together. f is a bolt, which secures the rear handle to the beam A. g is a bolt, passing through the beam A about midway thereof, and which firmly secures to said beam the forward handle B, as well as the guide-rods C C; and outside of the plate D are holes *h h*, which receive and in which works the self-adjusting clevis G. This clevis G is constructed with two shoulders, which play in the holes *h h*. Through the centre of the bar of the clevis there is a hole, which receives the shank of the eye *i*. This shank is riveted on the rear side of the bar, and thereby rendered secure. The great advantage of this clevis G is found in the fact that it is self-adjusting, so that, it matters not whether the rods C C, in which it has its bearings, are elevated or lowered along the guide-plate D, the angle of draught for the horse is the same.

The foregoing description answers for both ploughs, as they are the exact counterparts of each other, with this single difference: When I use the double plough, I construct the beam A of the left-hand about six inches longer than that of the right-hand plough, so as to enable any unbroken clod, stone, or other obstacle that may be thrown up to pass between the shovels.

When it is desired to plough a single furrow, either plough can be used. I prefer the left-hand plough, its greater length of beam giving it a steady and regular run, which cannot be obtained with a short-beam plough, such as my right-hand plough must of necessity be. When the left-hand plough is used as a single plough, the rear left-hand handle B is secured by the bolt precisely as in the double plough; but, the rear right-hand handle being longer, when it is brought in contact with the beam A of the left-hand plough its point of contact is a few inches forward of the hole which receives the bolt *f*. Consequently the beam A of the left-hand plough has an additional hole, through which passes a bolt, *j*, and which firmly secures the rear right-hand handle B to said beam. The bolt *g* firmly secures the forward handles of both ploughs, as well as the rods C C, to the beam A. The bolt *e* also attaches both, C C, to the guide-plate D.

When the double plough is used, the short bolt *g* is dispensed with, and a rod, H, is introduced, in which are two shoulders K K, which act as bearings for the beams A A of the two ploughs. Outside of these shoulders K there is sufficient length of rod to pass through the beam A, handle B, and rod C, in order to hold them together, as does the bolt *g* in the single plough. On each end of this rod H a screw-thread is cut, which extends beyond the beams A, and is there secured by means of nuts. When the double plough is used, there is also introduced an S-shaped brace-bar between the rear end of the beams A, and firmly secured to said beams by means of the bolts *f f*.

The guide-plate D acts as a gauge to regulate the depth of furrow. When a furrow of but slight depth is required, the bolt *e*, which regulates the position of the rod C, is placed in the hole *b* nearest the beam. If a deeper furrow is required, the bolt *e* is elevated to one of the upper holes. The higher the hole in which the bolt *e* is placed the deeper will be the furrow, controlling, as it does, the rods C C, and they in turn, controlling the shoe and shovel.

Having thus fully described my invention, what I claim therein as new, and desire Letters Patent therefor, is—

1. I claim the combination of the shoe E and shovel F, when the same are so arranged that the shoe E presents its entire face to the ground, and projects sufficiently far beyond the point of the shovel not only to protect and guard the same, but also to free the shovel from all labor and strain in opening the furrow, substantially as shown.

2. I claim the combination of the rods C C, guide-plate D, and bolt *e*, for regulating the depth of cut of the shoe, substantially as described.

3. I claim the arrangement of the rods C C, guide-plate D, and bolt *e*, so that the same can be applied to a single or double plough, substantially as described.

4. I claim the combination of the curved beam A, shoe E, and shovel F, when the same are connected and arranged substantially as described.

5. I claim the combination of the beam A, shoe E, shovel F, rods C C, and guide-plate D, when the same are arranged and operate substantially as described and for the purpose set forth.

6. I claim the self-adjusting clevis G, secured to the rods C C, substantially as described and for the purpose set forth.

W. R. HARMON.

Witnesses:
JOHN S. HOLLINGSHEAD,
JOHN D. BLOOR.